United States Patent
Yu et al.

(10) Patent No.: US 10,643,300 B2
(45) Date of Patent: May 5, 2020

(54) IMAGE DISPLAY METHOD, CUSTOM METHOD OF SHAPED CAMBERED CURTAIN, AND HEAD-MOUNTED DISPLAY DEVICE

(71) Applicant: Tencent Technology (Shenzhen) Company Limited, Shenzhen (CN)

(72) Inventors: Zhixiong Yu, Shenzhen (CN); Yao Wang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 72 days.

(21) Appl. No.: 16/049,335

(22) Filed: Jul. 30, 2018

(65) Prior Publication Data
US 2018/0365797 A1 Dec. 20, 2018

Related U.S. Application Data

(63) Continuation-in-part of application No. PCT/CN2017/077793, filed on Mar. 23, 2017.

(30) Foreign Application Priority Data

Mar. 28, 2016 (CN) .......................... 2016 1 0184479

(51) Int. Cl.
*G06T 3/00* (2006.01)
(52) U.S. Cl.
CPC .......... *G06T 3/0018* (2013.01); *G06T 3/0093* (2013.01)
(58) Field of Classification Search
CPC ..................... G06T 3/0018; G06T 3/0093
See application file for complete search history.

(56) References Cited

U.S. PATENT DOCUMENTS 9,998,659 B2 * 6/2018 Bassi .................... G06T 3/0062
2002/0190987 A1 12/2002 Travers et al.
(Continued)

FOREIGN PATENT DOCUMENTS

CN 101232577 A 7/2008
CN 101809991 A 8/2010
(Continued)

OTHER PUBLICATIONS

Ying X., "Fisheye Lenses Calibration Using Straight-Line Spherical Perspective Projection Constraint" 2006, Springer, Berlin, Heidelberg Lecture Notes in Computer Science, vol. 3852. pp. 61-70 (Year: 2006).*

(Continued)

*Primary Examiner* — Terrell M Robinson
(74) *Attorney, Agent, or Firm* — Morgan, Lewis & Bockius LLP

(57) ABSTRACT

The present disclosure relates to an image display method performed by a head-mounted display device. The device establishes a rectangular projection plane model that shares a same aspect ratio with a picture shot by a lens and then transforms the rectangular projection plane model into a shaped projection plane model through anti-distortion processing. Next, the device defines a shaped cambered spherical model by intersecting the shaped projection plane model with a spherical model according to a horizontal field angle and a vertical field angle of the lens and then projects an original distorted image onto the shaped cambered spherical model to remove image distortion. Finally, the device displays the image rendered on the shaped cambered spherical model.

18 Claims, 8 Drawing Sheets

(56) References Cited

U.S. PATENT DOCUMENTS

| | | | | |
|---|---|---|---|---|
| 2007/0124783 | A1* | 5/2007 | Ahiska | H04N 5/23206 725/105 |
| 2008/0143709 | A1* | 6/2008 | Fassero | G06T 3/00 345/419 |
| 2012/0051661 | A1* | 3/2012 | Minakawa | G06T 3/0018 382/274 |
| 2014/0314336 | A1* | 10/2014 | Yagi | G06T 3/0062 382/282 |
| 2015/0181114 | A1 | 6/2015 | Choi et al. | |
| 2016/0234438 | A1* | 8/2016 | Satoh | G06T 3/0018 |
| 2016/0353090 | A1* | 12/2016 | Esteban | G02B 27/0172 |
| 2017/0160796 | A1* | 6/2017 | Oto | G02B 27/02 |

FOREIGN PATENT DOCUMENTS

| | | | |
|---|---|---|---|
| CN | 102508398 | A | 6/2012 |
| CN | 102780852 | A | 11/2012 |
| CN | 104200468 | A | 12/2014 |
| CN | 104363986 | A | 2/2015 |
| CN | 105354808 | A | 2/2016 |
| CN | 105556373 | A | 5/2016 |
| CN | 105869110 | A | 8/2016 |
| JP | H1173489 | A | 3/1999 |
| JP | 2007166317 | A | 6/2007 |
| WO | WO 2013130082 | A1 | 9/2013 |
| WO | WO 2015102451 | A1 | 7/2015 |

OTHER PUBLICATIONS

Kannala, Juho, "A generic camera model and calibration method for conventional, wide-angle, and fish-eye lenses", IEEE Transactions on Pattern Analysis and Machine Intelligence, 2006, vol. 28, pp. 1335-1340 (Year: 2006).*

Zhang, Bokai, "Fisheye Lens Distortion Correction Based on an Ellipsoidal Function Model", 2015 International Conference on Industrial Informatics—Computing Technology, Intelligent Technology, Industrial Information Integration, pp. 217-221 (Year: 2015).*

Tencent Technology, ISRWO, PCT/CN2017/077793, dated Jun. 2, 2017, 8 pgs.

Tencent Technology, IPRP, PCT/CN2017/077793, dated Oct. 20, 2018, 7 pgs.

* cited by examiner

IMAGE DISPLAY METHOD, CUSTOM METHOD OF SHAPED CAMBERED CURTAIN, AND HEAD-MOUNTED DISPLAY DEVICE

PRIORITY CLAIM AND RELATED APPLICATION

This application is a continuation-in-part application of PCT/CN2017/077793, entitled "IMAGE DISPLAY METHOD, CUSTOM METHOD OF SHAPED CAMBERED CURTAIN, AND HEAD-MOUNTED DISPLAY DEVICE" filed on Mar. 23, 2017, which claims priority to Chinese Patent Application No. 201610184479.8, filed with the State Intellectual Property Office of the People's Republic of China on Mar. 28, 2016, and entitled "IMAGE DISPLAY METHOD, CUSTOM METHOD OF SHAPED CAMBERED CURTAIN, AND HEAD-MOUNTED DISPLAY DEVICE", all of which are incorporated herein by reference in their entirety.

FIELD OF THE TECHNOLOGY

The present disclosure relates to the field of image display, and in particular, to an image display method, a custom method of a shaped cambered spherical model, and a head-mounted display device.

BACKGROUND OF THE DISCLOSURE

A head-mounted display device is an important hardware device in a virtual reality technology. It obtains a head direction of a user in real time, and displays scenes in the direction to eyes of the user. In this process, being real-time and being accurate are two main indicators that affect immersion of the user. Being real-time means completing image rendering of a view direction of the user and displaying the image rendered on the shaped cambered spherical model in an extremely short time. Being accurate means: 1. An image seen by the user needs to be matched with prior knowledge, for example, a ground is flat and a wall is straight; and 2. Pixels of the image are consistent, so that when the user spins the head, the image seen by the user is on a plane, instead of an abnormal effect that the center of the image is close and the periphery is far (or the center of the image is far and the periphery is close).

Because a collecting device of panoramic or wide-angle pictures uses a fisheye or wide-angle lens, a collected original image suffers severe lens distortion. Such a distorted picture is not suitable for being directly rendered and displayed to human eyes, and a lens anti-distortion operation needs to be performed.

A conventional head-mounted display device displays an image in two manners. One is directly rendering an original distorted image on a curtain, which reduces image processing processes, and accelerates a display speed. However, a scene seen by a user by using the head-mounted display device is inconsistent with a scene seen in an actual scenario, which reduces the accuracy. The other manner is collecting an original image by using a shooting device with a lower visual angle. Even though no anti-distortion correction is performed on a lens corresponding to the lower visual angle, the accuracy of the image can be kept. However, generally, an effective visual angle of the head-mounted display device is over 80 degrees, and if a lens angle of the shooting device is lower than the visual angle of the head-mounted display device, in a normal display state, image borders are seen by the user. As shown in FIG. 1, the image display effect is poor.

SUMMARY

According to various embodiments of this application, an image display method, a custom method of a shaped cambered spherical model, and a head-mounted display device are provided.

According to a first aspect of the present disclosure, an image display method is performed at a head-mounted device having one or more processors and memory storing a plurality of programs to be executed by the one or more processors, the method comprising:

obtaining an original distorted image;

establishing a rectangular projection plane model that shares a same aspect ratio with a picture shot by a lens;

transforming the rectangular projection plane model into a shaped projection plane model through anti-distortion processing;

establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively;

casting, from a spherical center of the spherical model, rays to four edges of the shaped projection plane model, wherein a spherical surface of the spherical model intercepted by the rays defines a shaped cambered spherical model;

projecting the original distorted image onto the shaped cambered spherical model to remove image distortion; and displaying the image rendered on the shaped cambered spherical model.

According to a second aspect of the present disclosure, a head-mounted display device includes memory and one or more processors, the memory storing a plurality of computer-readable instructions, and when executed by the one or more processors, cause the one or more processors to perform the aforementioned image display method.

According to a third aspect of the present disclosure, a non-transitory computer readable storage medium stores a plurality of computer-readable instructions that, when executed by one or more processors of a head-mounted display device, cause the one or more processors to perform the aforementioned image display method.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
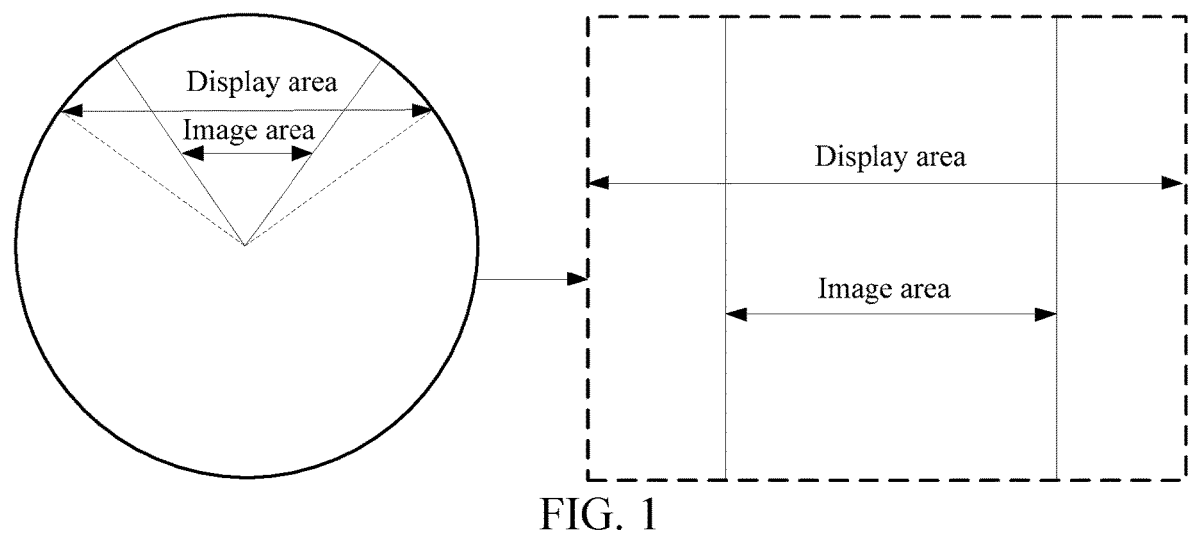
FIG. 1 is a relation diagram of a visual angle of a shooting device and a visual angle of a head-mounted display.
Figure 2:
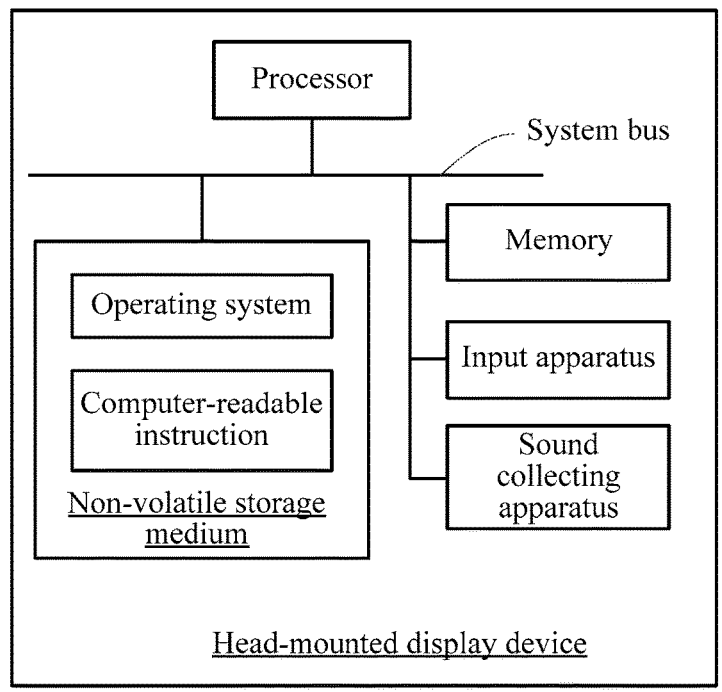
FIG. 2 is a schematic diagram of an inner structure of a head-mounted display device according to an embodiment.

FIG. 2 is a schematic diagram of an inner structure of a head-mounted display device according to an embodiment. As shown in FIG. 2, the head-mounted display device includes a processor, a non-transitory computer readable storage medium, a memory, a sound collecting apparatus, a display screen, and an input apparatus that are connected by using a system bus. The non-transitory computer readable storage medium of the head-mounted display device stores an operating system, and further stores a computer-readable instruction. The computer-readable instruction is executed to implement an image display method. The processor is configured to provide computing and control capabilities to support running of the entire terminal. The memory of the head-mounted display device provides an environment for running of the computer-readable instruction in the non-transitory computer readable storage medium. The display screen of the head-mounted display device may be a liquid crystal display screen or an e-ink display screen or the like. The input apparatus may be a touch layer covering the display screen, or may be a button, a trackball, or a touchpad disposed on a server housing, or may be an external keyboard, touchpad, mouse or the like. The head-mounted display device may be a head-mounted display or the like. A person skilled in the art may understand that, in the structure shown in FIG. 2, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

Figure 3:
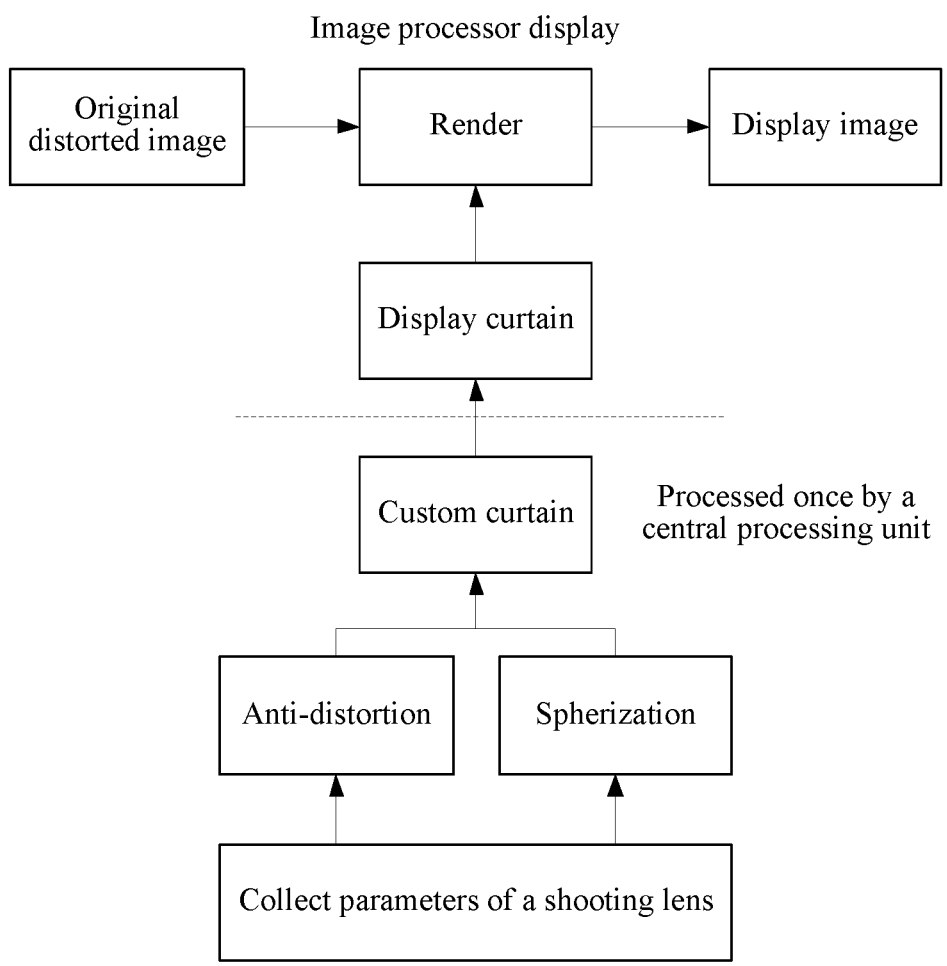
FIG. 3 is a flowchart of image display of a head-mounted display device according to an embodiment.

FIG. 3 is a schematic diagram of a principle of image display of a head-mounted display device according to an embodiment. As shown in FIG. 3, a rectangular projection plane model that shares a same aspect ratio with a shot picture is established, parameters of a shooting lens are collected, anti-distortion processing and spherization processing are performed on the rectangular projection plane model according to the collected parameters of the lens, to obtain a custom curtain, the custom curtain is used as a display curtain, and is processed once by a central processing unit (CPU) before an image and a video are displayed, an original distorted image is stretched by using a graphic processing unit (GPU) to fill up the display curtain, to complete rendering, and a rendered image is displayed. On the condition that a video shooting device is not changed, a custom curtain is not changed.

Figure 4:
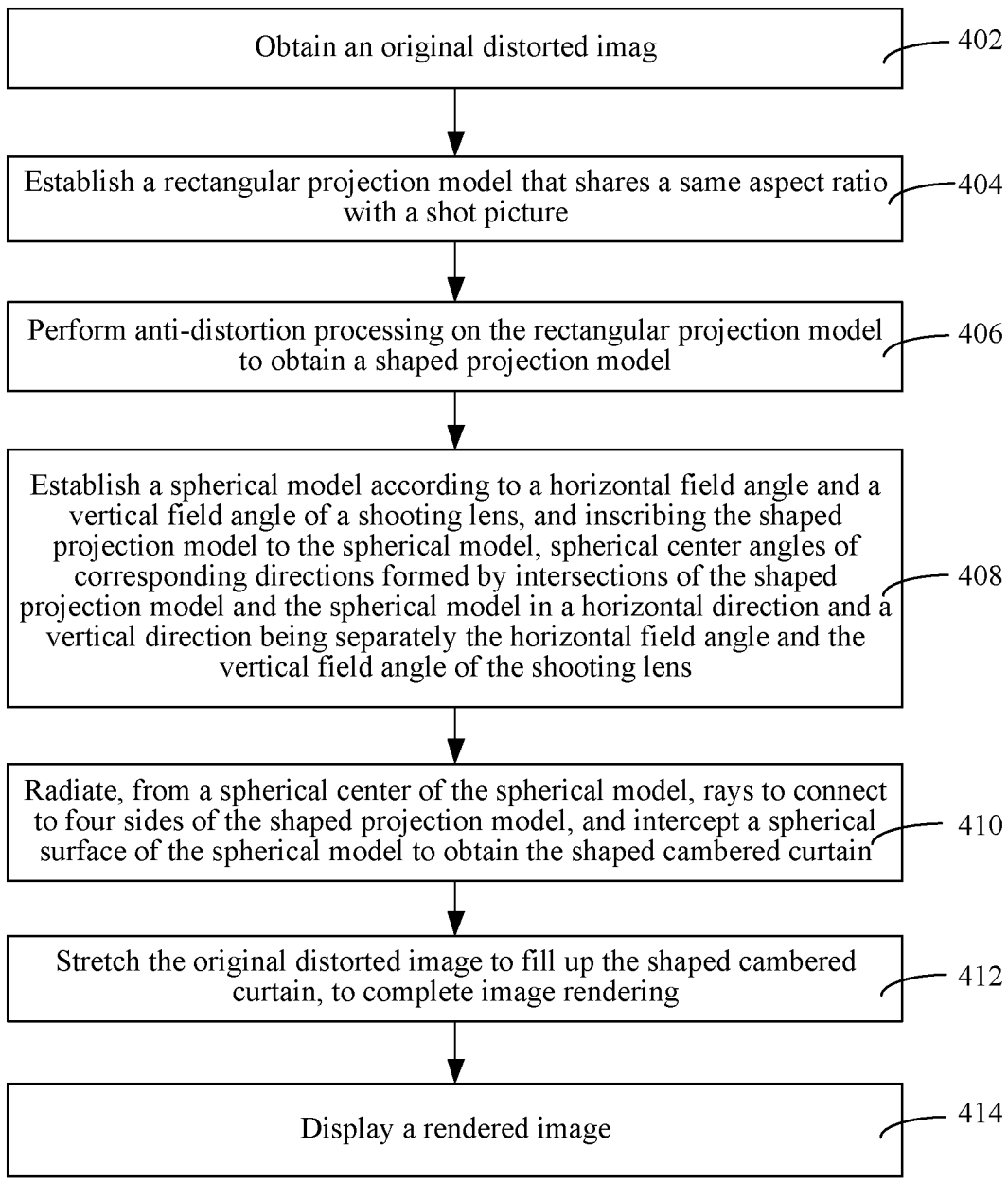
FIG. 4 is a flowchart of an image display method according to an embodiment.

FIG. 4 is a flowchart of an image display method according to an embodiment. As shown in FIG. 4, the image display method may run on a head-mounted display device, and includes the following steps.

Step 402. Obtain an original distorted image.

In this embodiment, an image is collected by using a collecting device such as a camera. Because the collecting device such as the camera uses a fisheye or wide-angle lens, and a collected original image suffers severe lens distortion, the image is an original distorted image.

Step 404. Establish a rectangular projection plane model that shares a same aspect ratio with a shot picture.

In this embodiment, the shot picture is a material that needs to be displayed. The aspect ratio of the shot picture is a ratio of the number of pixels of the width of the picture to the number of pixels of the height of the picture, such as 4:3 or 16:9. The rectangular projection plane model may be a rectangular planar curtain. The rectangular projection plane model that shares the same aspect ratio with the shot picture is established, and when an image is projected to the spherical model according to the rectangular projection plane model, the image does not suffer any aspect ratio distortion. Therefore, the accuracy of the image is ensured.

Step 406. Perform anti-distortion processing on the rectangular projection plane model to obtain a shaped projection plane model.

In this embodiment, the transforming the rectangular projection plane model into a shaped projection plane model through anti-distortion processing is restoring a shot distorted image, and changing an image whose content distorted border is rectangular to an image whose content includes no distorted border deformation. The rectangular projection plane model may be a rectangular planar curtain.

The rectangular projection plane model is processed by using an anti-distortion algorithm, to obtain the shaped projection plane model. The process of processing performed by using the anti-distortion algorithm includes: coordinate transformation and grayscale reconstruction. The coordinate transformation may be classified into a forward mapping method from a distorted image to a target image and a backward mapping method from a target image to a distorted image. The method of grayscale reconstruction includes: nearest neighbor interpolation, double linear interpolation, and cubic convolution interpolation. An existing distortion correction algorithm is used in the anti-distortion algorithm.

Figure 5:
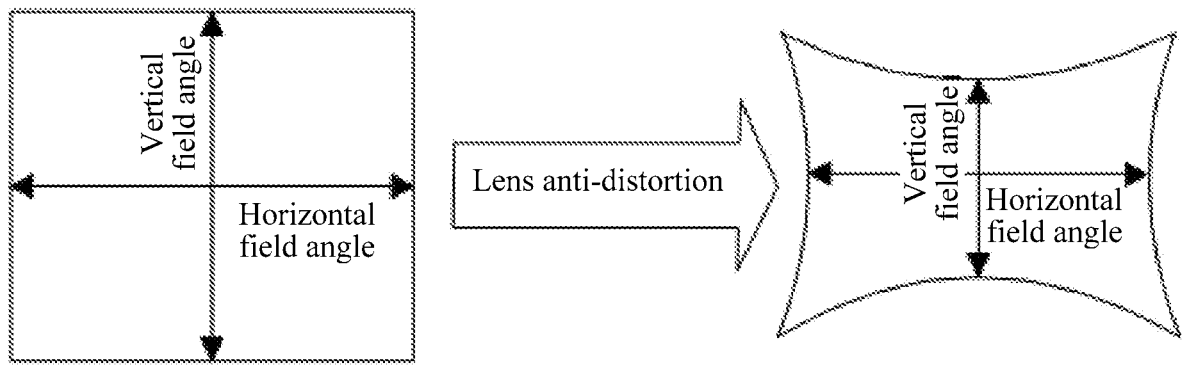
FIG. 5 is a schematic diagram of a rectangular planar curtain being changed to a shaped planar curtain by means of anti-distortion.

FIG. 5 is a schematic diagram of a rectangular planar curtain being changed to a shaped planar curtain by means of anti-distortion. As shown in FIG. 5, borders of the rectangular planar curtain change to borders of the shaped planar curtain.

Figure 6:
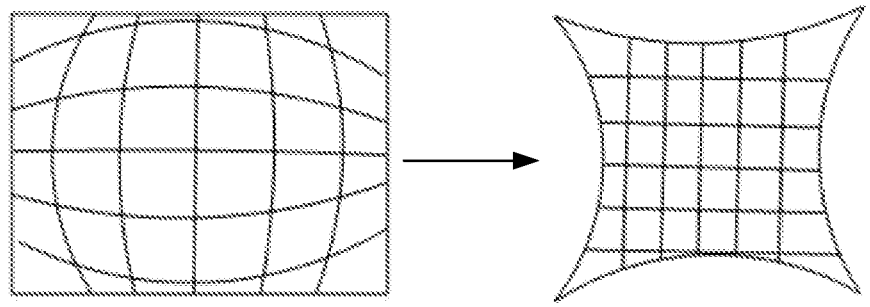
FIG. 6 is a schematic diagram of an original distorted image and an image obtained after anti-distortion is performed.

FIG. 6 is a schematic diagram of an original distorted image and an image obtained after anti-distortion is performed. As shown in FIG. 6, the first image is an original distorted image, and anti-distortion processing is performed on the original distorted image to obtain the second image, that is, an image obtained after anti-distortion is performed.

Step 408. Establish a spherical model according to a horizontal field angle and a vertical field angle of a shooting lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively.

In this embodiment, the horizontal field angle and the vertical field angle of the lens may be separately obtained by using design materials of the lens. The shaped projection plane model may be a shaped planar curtain.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes:

establishing a spherical model, placing the shaped projection plane model to be perpendicular to a radial direction of the spherical model, and equally zooming the shaped projection plane model according to the horizontal field angle of the lens, so that a horizontal center line of the shaped projection plane model is a spherical center angle that corresponds to a chord and that is equal to the horizontal field angle.

Figure 7:
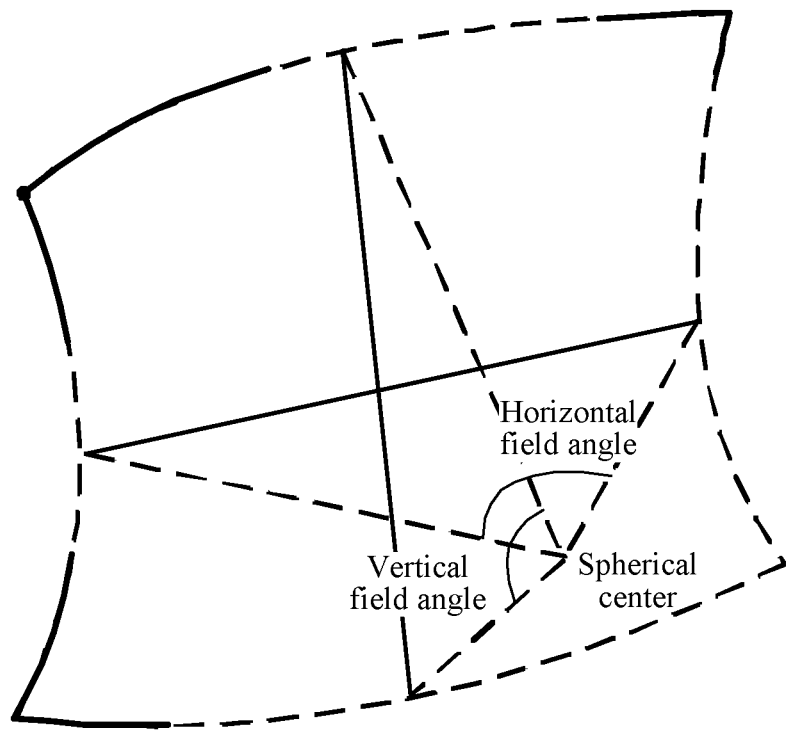
FIG. 7 is a schematic diagram of zooming a shaped projection plane model by a field angle of a shooting lens according to an embodiment.

After the lens anti-distortion is performed, the horizontal field angle and the vertical field angle of the lens are equally distributed, that is, by using the vertical field angle and a vertical center line of the shaped projection plane model, equal sizes of the zoomed model and the horizontal direction are limited. The size of the established spherical model may be not limited because the image is projected in an angle. That is, if the radius is large, the projection of the image is also equally increased; and if the radius is small, the projection of the image is equally reduced. However, spherical center angles of the projected images are the same, and images seen from the spherical center angles are also the same. FIG. 7 is a schematic diagram of zooming a shaped projection plane model by a field angle of a shooting lens according to an embodiment. As shown in FIG. 7, a shaped projection plane model is equally zoomed according to a horizontal field angle of a shooting lens, so that a horizontal center line of the shaped projection plane model is a spherical center angle that corresponds to a chord and that is just the horizontal field angle of the lens, and a vertical center line is a spherical center angle that corresponds to a chord and that is a vertical field angle of the lens.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes:

establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the shaped projection plane model according to the vertical field angle of the lens, so that a vertical center line of the shaped projection plane model is a chord that corresponds to the spherical center angle and that is equal to the vertical field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the spherical model according to the horizontal field angle of the lens, so that a horizontal center line of the shaped projection plane model is a spherical center angle that corresponds to a chord and that is equal to the horizontal field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the spherical model according to the vertical field angle of the lens, so that a vertical center line of the shaped projection plane model is a spherical center angle that corresponds to a chord and that is equal to the horizontal field angle.

Step 410. Radiate, from a spherical center of the spherical model, rays to connect to four edges of the shaped projection plane model, and intercept a spherical surface of the spherical model to obtain the shaped cambered spherical model.

In an embodiment, the step of casting, from a spherical center of the spherical model, rays to four edges of the shaped projection plane model, wherein a spherical surface of the spherical model intercepted by the rays defines a shaped cambered spherical model includes (1) and (2).

(1) Radiate, from the spherical center of the spherical model, multiple rays to connect to the four edges of the shaped projection plane model, to construct a rectangular pyramid.

Figure 8:
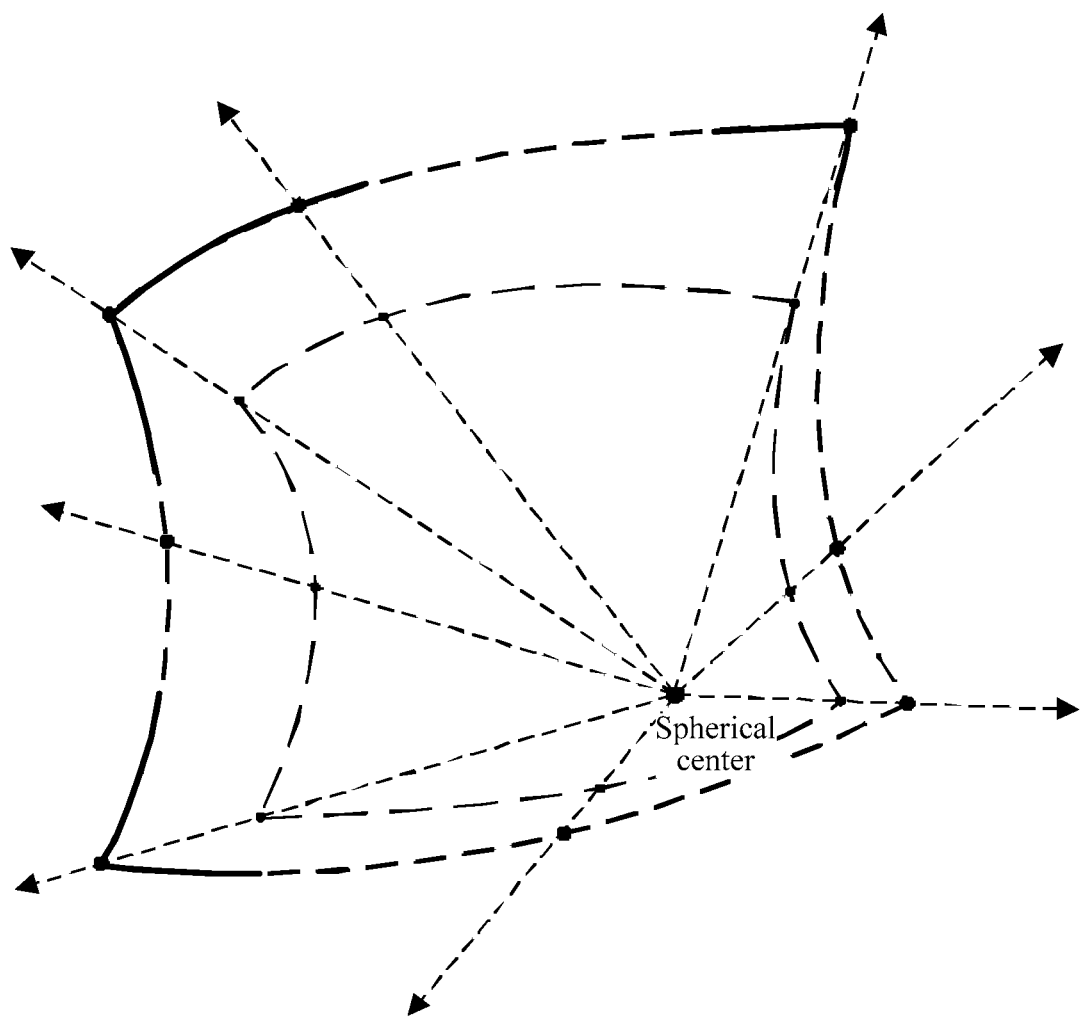
FIG. 8 is a schematic diagram of radiating countless rays from a spherical center to penetrate four sides of a shaped projection plane model according to an embodiment.

FIG. 8 is a schematic diagram of radiating countless rays from a spherical center to penetrate four sides of a shaped projection plane model according to an embodiment. As shown in FIG. 8, countless rays are radiated from a spherical center to penetrate four sides of a shaped projection plane model, to construct a rectangular pyramid.

(2) Lengthen the rectangular pyramid along a radial direction of the spherical model, to intersect with the spherical surface of the spherical model, intercept a part of the spherical model, and use the intercepted part of the spherical model as the shaped cambered spherical model.

Figure 9:
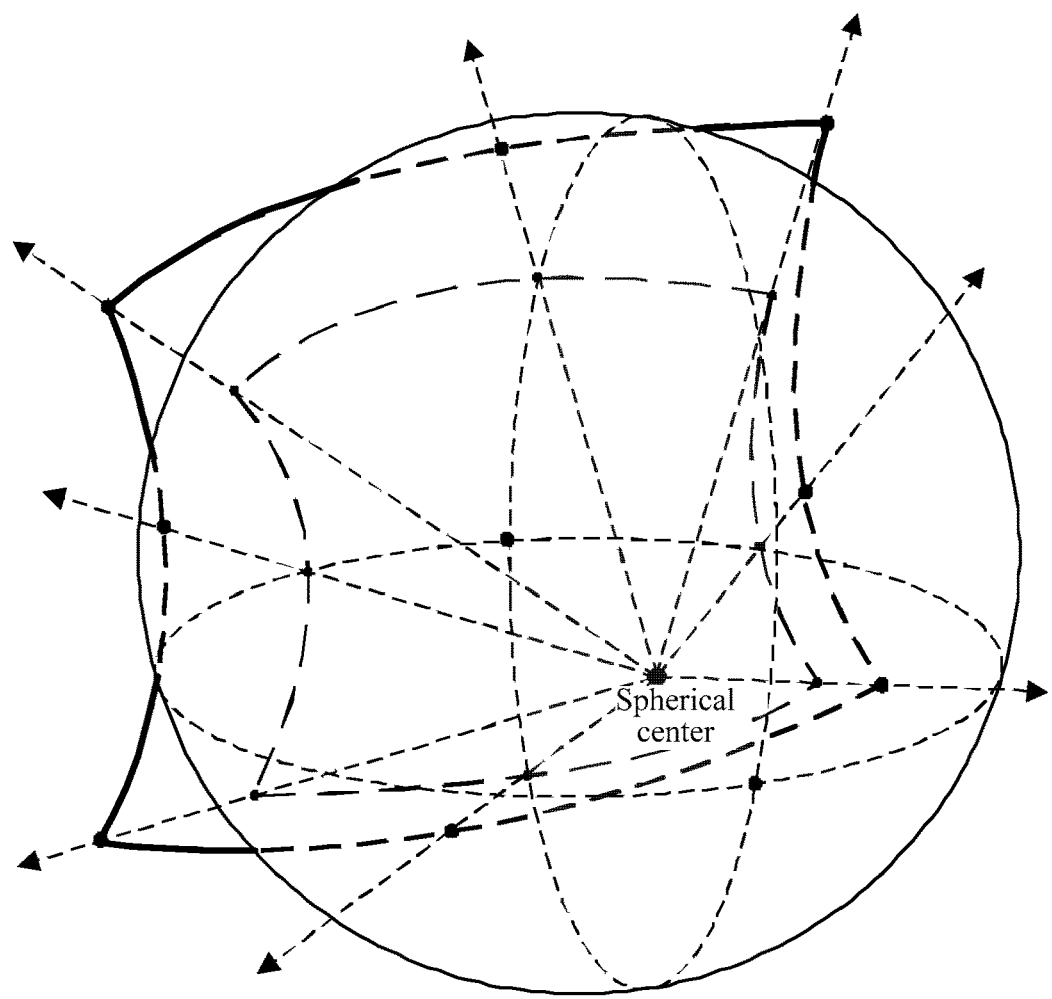
FIG. 9 is a schematic diagram of a part intercepted from a spherical curtain.

FIG. 9 is a schematic diagram of a part intercepted from a spherical curtain. As shown in FIG. 9, a rectangular pyramid is lengthened along a radial direction of a spherical model, to intersect with a spherical surface of the spherical model, a part of the spherical model is intercepted, the intercepted part of the spherical model is used as the shaped cambered spherical model, and when a visual angle is at a spherical center, a seen shape formed by borders of the spherical model should be the same as the shaped projection plane model. The original distorted image is stretched to fill up the shaped cambered spherical model, that is, shooting lens anti-distortion and spherization mapping are performed on the image, and an image rendering task is also completed.

Figure 10:
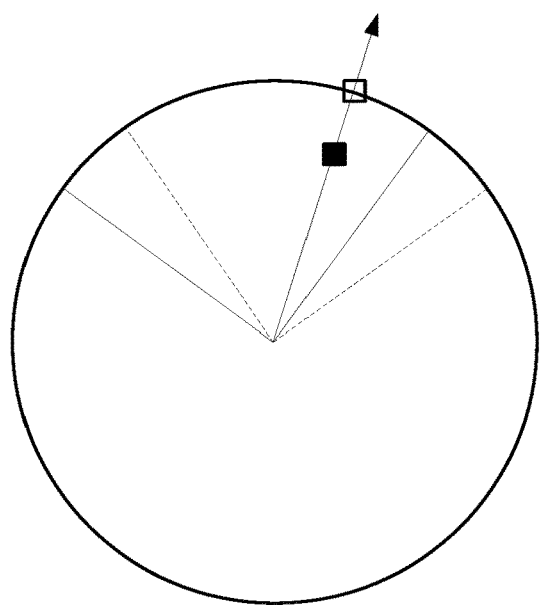
FIG. 10 is a schematic diagram of a process of a visual field being changed after an image is spherized according to an embodiment.

FIG. 10 is a schematic diagram of a process of a visual field being changed after an image is spherized according to an embodiment. As shown in FIG. 10, after spherization mapping is performed on the image, when a visual field changes in the same way, an image mapping distance keeps unchanged. In FIG. 10, the hollow solid line is the same as the hollow dotted line.

Step 412. Stretch the original distorted image to fill up the shaped cambered spherical model, to complete image rendering.

In this embodiment, the original distorted image is stretched to fill up the shaped cambered spherical model, to complete image rendering.

Step 414. Display a rendered image.

In the foregoing image display method, after an original distorted image is filled up a shaped cambered spherical model obtained after anti-distortion processing and spherization mapping processing are performed, that is, after anti-distortion and spherization mapping processing are performed on the original distorted image, image rendering is completed, a displayed image is accurate and real-time, and after spherization mapping, when a visual field also changes, an image mapping distance keeps unchanged.

It should be noted that, the image display method may further be applied to other display devices.

Figure 11:
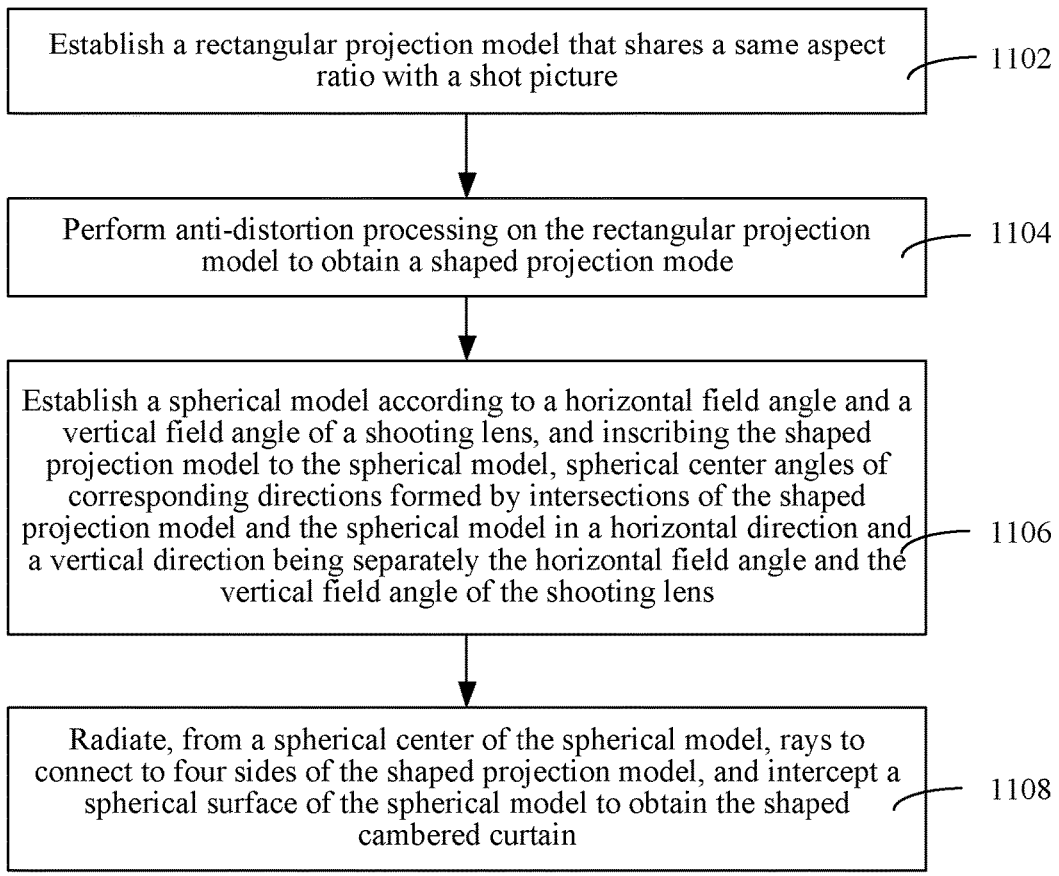
FIG. 11 is a flowchart of a custom method of a shaped cambered spherical model according to an embodiment.

FIG. 11 is a flowchart of a custom method of a shaped cambered spherical model according to an embodiment. As shown in FIG. 11, the custom method of a shaped cambered spherical model includes the following steps.

Step 1102: Establish a rectangular projection plane model that shares a same aspect ratio with a shot picture.

In this embodiment, the shot picture is a material that needs to be displayed. The aspect ratio of the shot picture is a ratio of the number of pixels of the width of the picture to the number of pixels of the height of the picture, such as 4:3 or 16:9. The rectangular projection plane model may be a rectangular planar curtain. The rectangular projection plane model that shares the same aspect ratio with the shot picture is established, and when the image is projected to the spherical model according to the rectangular projection plane model, the image does not suffer any aspect ratio distortion. Therefore, the accuracy of the image is ensured.

Step 1104: Perform anti-distortion processing on the rectangular projection plane model to obtain a shaped projection plane model.

In this embodiment, the transforming the rectangular projection plane model into a shaped projection plane model through anti-distortion processing is restoring a shot distorted image, and changing an image whose content distorted border is rectangular to an image whose content includes no distorted border deformation. The rectangular projection plane model may be a rectangular planar curtain.

The rectangular projection plane model is processed by using an anti-distortion algorithm, to obtain the shaped projection plane model. The process of processing performed by using the anti-distortion algorithm includes: coordinate transformation and grayscale reconstruction. The coordinate transformation may be classified into a forward mapping method from a distorted image to a target image and a backward mapping method from a target image to a distorted image. The method of grayscale reconstruction includes: nearest neighbor interpolation, double linear interpolation, and cubic convolution interpolation. An existing distortion correction algorithm is used in the anti-distortion algorithm.

Step 1106: Establish a spherical model according to a horizontal field angle and a vertical field angle of a shooting lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively.

In this embodiment, the horizontal field angle and the vertical field angle of the lens may be separately obtained by using design materials of the lens. The shaped projection plane model may be a shaped planar curtain.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes:

establishing a spherical model, placing the shaped projection plane model to be perpendicular to a radial direction of the spherical model, and equally zooming the shaped projection plane model according to the horizontal field angle of the lens, so that a horizontal center line of the shaped projection plane model is a spherical center angle that corresponds to a chord and that is equal to the horizontal field angle.

After the lens anti-distortion is performed, the horizontal field angle and the vertical field angle of the lens are equally distributed, that is, by using the vertical field angle and a vertical center line of the shaped projection plane model, equal sizes of the zoomed model and the horizontal direction are limited. The size of the established spherical model may be not limited because the image is projected in an angle. That is, if the radius is large, the projection of the image is also equally increased; and if the radius is small, the projection of the image is equally reduced. However, spherical center angles of the projected images are the same, and images seen from the spherical center angles are also the same.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes:

establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the spherical model according to the horizontal field angle of the lens, so that a horizontal center line of the shaped projection plane model is a spherical center angle that corresponds to a chord and that is equal to the horizontal field angle.

In an embodiment, the step of establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively includes: establishing a spherical model, placing the shaped projection plane model to be perpendicular to a radial direction of the spherical model, and equally zooming the spherical model according to the vertical field angle of the lens, so that a vertical center line of the shaped projection plane model is a spherical center angle that corresponds to a chord and that is equal to the horizontal field angle.

Step 1108: Radiate, from a spherical center of the spherical model, rays to connect to four edges of the shaped projection plane model, and intercept a spherical surface of the spherical model to obtain the shaped cambered spherical model.

In an embodiment, the step of casting, from a spherical center of the spherical model, rays to four edges of the shaped projection plane model, wherein a spherical surface of the spherical model intercepted by the rays defines a shaped cambered spherical model includes: casting, from the spherical center of the spherical model, multiple rays to the four edges of the shaped projection plane model, to construct a rectangular pyramid; and projecting the rectangular pyramid along a radial direction of the spherical model, to intersect with the spherical surface of the spherical model, intercepting a part of the spherical model, and using the intercepted part of the spherical model as the shaped cambered spherical model.

Figure 12:
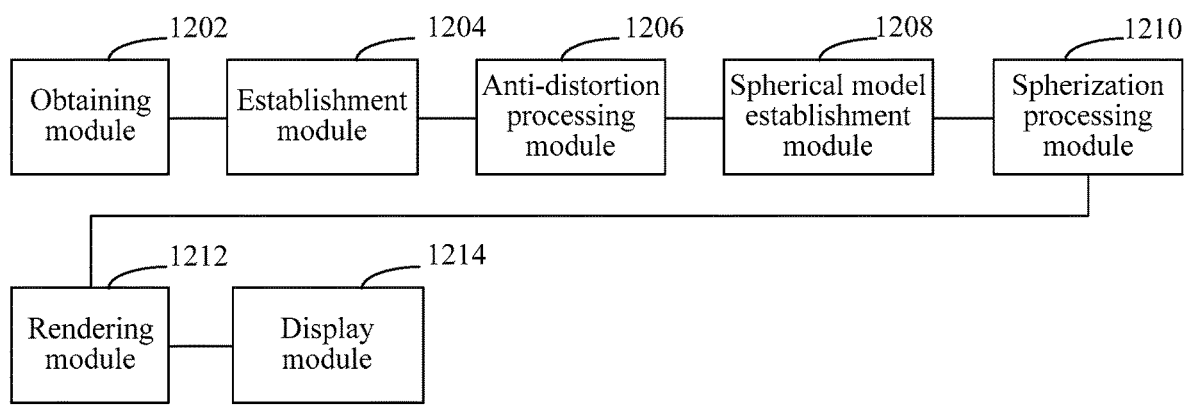
FIG. 12 is a structural block diagram of an image display apparatus according to an embodiment.

In the foregoing custom method of a shaped cambered spherical model, a rectangular projection plane model that shares a same aspect ratio with a shot picture is established, anti-distortion processing is performed on the rectangular projection plane model to obtain a shaped projection plane model, the shaped projection plane model is inscribed to a spherical model, spherical center angles of corresponding directions formed by intersections of the shaped projection plane model and the spherical model in a horizontal direction and a vertical direction being separately the horizontal field angle and the vertical field angle of a shooting lens, rays radiated from the spherical center to penetrate four edges of the shaped projection plane model and lengthened to the spherical model, and a spherical surface of the spherical model is intercepted, to obtain the shaped cambered spherical model. The shaped cambered spherical model may perform anti-distortion and spherization processing on an image, so as to correct a distorted image, the image through the shaped cambered spherical model is accurate and real time, and the computation is less. FIG. 12 is a structural block diagram of an image display apparatus according to an embodiment. As shown in FIG. 12, an image display apparatus includes an obtaining module 1202, an establishment module 1204, an anti-distortion processing module 1206, a spherical model establishment module 1208, a spherization processing module 1210, a rendering module 1212, and a display module 1214.

The obtaining module 1202 is configured to obtain an original distorted image.

The establishment module 1204 is configured to establish a rectangular projection plane model that shares a same aspect ratio with a shot picture.

The anti-distortion processing module 1206 is configured to perform anti-distortion processing on the rectangular projection plane model to obtain a shaped projection plane model.

The spherical model establishment module 1208 is configured to establish a spherical model according to a horizontal field angle and a vertical field angle of a shooting lens, and inscribe the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively.

The spherization processing module 1210 is configured to radiate, from a spherical center of the spherical model, rays to connect to four edges of the shaped projection plane model, and intercept a spherical surface of the spherical model to obtain the shaped cambered spherical model.

The rendering module 1212 is configured to stretch the original distorted image to fill up the shaped cambered spherical model, to complete image rendering.

The display module 1214 is configured to display a rendered image.

In the foregoing image display method, after an original distorted image is filled up a shaped cambered spherical model obtained after anti-distortion processing and spherization mapping processing are performed, that is, after anti-distortion and spherization mapping processing are performed on the original distorted image, image rendering is completed, a displayed image is accurate and real-time, and after spherization mapping, when a visual field also changes, an image mapping distance keeps unchanged.

Alternatively, the spherical model establishment module 1208 is further configured to establish a spherical model, place the shaped projection plane model to be perpendicular to a radial direction of the spherical model, and equally zoom the shaped projection plane model according to the horizontal field angle of the lens, so that a horizontal center line of the shaped projection plane model is a spherical center angle that corresponds to a chord and that is equal to the horizontal field angle.

Alternatively, the spherical model establishment module 1208 is further configured to establish a spherical model, place the shaped projection plane model to be perpendicular to a radial direction of the spherical model, and equally zoom the shaped projection plane model according to the vertical field angle of the lens, so that a vertical center line of the shaped projection plane model is a spherical center angle that corresponds to a chord and that is equal to the vertical field angle.

Alternatively, the spherical model establishment module 1208 is further configured to establish a spherical model, place the shaped projection plane model to be perpendicular to a radial direction of the spherical model, and equally zoom the spherical model according to the horizontal field angle of the lens, so that a horizontal center line of the shaped projection plane model is a spherical center angle that corresponds to a chord and that is equal to the horizontal field angle.

Alternatively, the spherical model establishment module 1208 is further configured to establish a spherical model, place the shaped projection plane model to be perpendicular to a radial direction of the spherical model, and equally zoom the spherical model according to the vertical field angle of the lens, so that a vertical center line of the shaped projection plane model is a spherical center angle that corresponds to a chord and that is equal to the horizontal field angle.

The spherization processing module 1210 is further configured to radiate, from the spherical center of the spherical model, multiple rays to connect to the four edges of the shaped projection plane model, to construct a rectangular pyramid; and lengthen the rectangular pyramid along a radial direction of the spherical model, to intersect with the spherical surface of the spherical model, intercept a part of the spherical model, and use the intercepted part of the spherical model as the shaped cambered spherical model.

Figure 13:
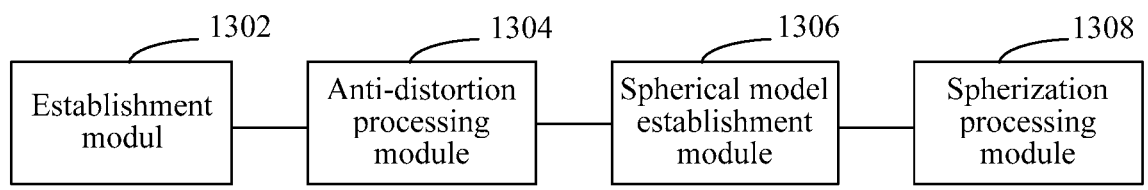
FIG. 13 is a structural block diagram of a custom apparatus of a shaped cambered spherical model according to an embodiment.

FIG. 13 is a structural block diagram of a custom apparatus of a shaped cambered spherical model according to an embodiment. As shown in FIG. 13, the custom apparatus of a shaped cambered spherical model includes an establishment module 1302, an anti-distortion processing module 1304, a spherical model establishment module 1306, and a spherization processing module 1308. Functions of the modules in FIG. 13 are the same as those of the corresponding modules in FIG. 12.

The establishment module 1302 is configured to establish a rectangular projection plane model that shares a same aspect ratio with a shot picture.

The anti-distortion processing module 1304 is configured to perform anti-distortion processing on the rectangular projection plane model to obtain a shaped projection plane model.

The spherical model establishment module 1306 is configured to establish a spherical model according to a horizontal field angle and a vertical field angle of a shooting lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively.

The spherization processing module 1308 is configured to radiate, from a spherical center of the spherical model, rays to connect to four edges of the shaped projection plane model, and intercept a spherical surface of the spherical model to obtain the shaped cambered spherical model.

The spherical model establishment module 1306 is further configured to establish a spherical model, place the shaped projection plane model to be perpendicular to a radial direction of the spherical model, and equally zoom the shaped projection plane model according to the horizontal field angle of the lens, so that a horizontal center line of the shaped projection plane model is a spherical center angle that corresponds to a chord and that is equal to the horizontal field angle.

Alternatively, the spherical model establishment module 1306 is further configured to establish a spherical model, place the shaped projection plane model to be perpendicular to a radial direction of the spherical model, and equally zoom the shaped projection plane model according to the vertical field angle of the lens, so that a vertical center line of the shaped projection plane model is a spherical center angle that corresponds to a chord and that is equal to the vertical field angle.

Alternatively, the spherical model establishment module 1306 is further configured to establish a spherical model, place the shaped projection plane model to be perpendicular to a radial direction of the spherical model, and equally zoom the spherical model according to the horizontal field angle of the lens, so that a horizontal center line of the shaped projection plane model is a spherical center angle that corresponds to a chord and that is equal to the horizontal field angle.

Alternatively, the spherical model establishment module 1306 is further configured to establish a spherical model, place the shaped projection plane model to be perpendicular to a radial direction of the spherical model, and equally zoom the spherical model according to the vertical field angle of the lens, so that a vertical center line of the shaped projection plane model is a spherical center angle that corresponds to a chord and that is equal to the horizontal field angle.

The spherization processing module 1308 is further configured to radiate from the spherical center of the spherical model, multiple rays to connect to the four edges of the shaped projection plane model, to construct a rectangular pyramid; and lengthen the rectangular pyramid along a radial direction of the spherical model, to intersect with the spherical surface of the spherical model, intercept a part of the spherical model, and use the intercepted part of the spherical model as the shaped cambered spherical model.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. The storage medium may be a magnetic disc, an optical disc, a read-only memory (ROM), or the like.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. An image display method performed at a head-mounted device having one or more processors and memory storing a plurality of programs to be executed by the one or more processors, the method comprising:
    obtaining an original distorted image;
    establishing a rectangular projection plane model that shares a same aspect ratio with a picture shot by a lens;
    transforming the rectangular projection plane model into a shaped projection plane model through anti-distortion processing;
    establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively;
    casting, from a spherical center of the spherical model, rays to four edges of the shaped projection plane model, wherein a spherical surface of the spherical model intercepted by the rays defines a shaped cambered spherical model;
    projecting the original distorted image onto the shaped cambered spherical model to remove image distortion; and
    displaying the image rendered on the shaped cambered spherical model.

2. The method according to claim 1, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:
    establishing a spherical model, placing the shaped projection plane model to be perpendicular to a radial direction of the spherical model, and equally zooming the shaped projection plane model according to the horizontal field angle of the lens, so that a horizontal center line of the shaped projection plane model is a spherical center angle that corresponds to a chord and that is equal to the horizontal field angle.

3. The method according to claim 1, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:
    establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

4. The method according to claim 1, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:
    establishing a spherical model, placing the shaped projection plane model to be perpendicular to a radial direction of the spherical model, and equally zooming the spherical model according to the horizontal field angle of the lens, so that a horizontal center line of the shaped projection plane model is a spherical center angle that corresponds to a chord and that is equal to the horizontal field angle.

5. The method according to claim 1, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:
    establishing a spherical model, placing the shaped projection plane model to be perpendicular to a radial direction of the spherical model, and equally zooming the spherical model according to the vertical field angle of the lens, so that a vertical center line of the shaped projection plane model is a spherical center angle that corresponds to a chord and that is equal to the horizontal field angle.

6. The method according to claim 1, wherein the step of casting, from a spherical center of the spherical model, rays to four edges of the shaped projection plane model, wherein a spherical surface of the spherical model intercepted by the rays defines a shaped cambered spherical model comprises:

casting, from the spherical center of the spherical model, multiple rays to the four edges of the shaped projection plane model, to construct a rectangular pyramid; and projecting the rectangular pyramid along a radial direction of the spherical model, to intersect with the spherical surface of the spherical model, intercepting a part of the spherical model, and using the intercepted part of the spherical model as the shaped cambered spherical model.

7. A head-mounted display device, comprising memory and one or more processors, the memory storing a plurality of computer-readable instructions that, when executed by the one or more processors, cause the one or more processors to perform the following steps:

obtaining an original distorted image;

establishing a rectangular projection plane model that shares a same aspect ratio with a picture shot by a lens;

transforming the rectangular projection plane model into a shaped projection plane model through anti-distortion processing;

establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively;

casting, from a spherical center of the spherical model, rays to four edges of the shaped projection plane model, wherein a spherical surface of the spherical model intercepted by the rays defines a shaped cambered spherical model;

projecting the original distorted image onto the shaped cambered spherical model to remove image distortion; and displaying the image rendered on the shaped cambered spherical model.

8. The head-mounted display device according to claim 7, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the shaped projection plane model according to the horizontal field angle of the lens, so that a horizontal center line of the shaped projection plane model is a spherical center angle that corresponds to a chord and that is equal to the horizontal field angle.

9. The head-mounted display device according to claim 7, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

10. The head-mounted display device according to claim 7, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the spherical model according to the horizontal field angle of the lens, so that a horizontal center line of the shaped projection plane model is a spherical center angle that corresponds to a chord and that is equal to the horizontal field angle.

11. The head-mounted display device according to claim 7, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the spherical model according to the vertical field angle of the lens, so that a vertical center line of the shaped projection plane model is a spherical center angle that corresponds to a chord and that is equal to the horizontal field angle.

12. The head-mounted display device according to claim 7, wherein the step of casting, from a spherical center of the spherical model, rays to four edges of the shaped projection plane model, wherein a spherical surface of the spherical model intercepted by the rays defines a shaped cambered spherical model comprises:

casting, from the spherical center of the spherical model, multiple rays to the four edges of the shaped projection plane model, to construct a rectangular pyramid; and projecting the rectangular pyramid along a radial direction of the spherical model, to intersect with the spherical surface of the spherical model, intercepting a part of the spherical model, and using the intercepted part of the spherical model as the shaped cambered spherical model.

13. A non-transitory computer readable storage medium storing a plurality of computer-readable instructions that, when executed by one or more processors of a head-mounted display device, cause the one or more processors to perform the following steps:

obtaining an original distorted image;

establishing a rectangular projection plane model that shares a same aspect ratio with a picture shot by a lens;

transforming the rectangular projection plane model into a shaped projection plane model through anti-distortion processing;

establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively;

casting, from a spherical center of the spherical model, rays to four edges of the shaped projection plane model, wherein a spherical surface of the spherical model intercepted by the rays defines a shaped cambered spherical model;

projecting the original distorted image onto the shaped cambered spherical model to remove image distortion; and displaying the image rendered on the shaped cambered spherical model.

14. The non-transitory computer readable storage medium according to claim 13, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the shaped projection plane model according to the horizontal field angle of the lens, so that a horizontal center line of the shaped projection plane model is a spherical center angle that corresponds to a chord and that is equal to the horizontal field angle.

15. The non-transitory computer readable storage medium according to claim 13, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the shaped projection plane model according to the vertical field angle of the lens, so that a vertical center line of the shaped projection plane model is a spherical center angle that corresponds to a chord and that is equal to the vertical field angle.

16. The non-transitory computer readable storage medium according to claim 13, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the spherical model according to the horizontal field angle of the lens, so that a horizontal center line of the shaped projection plane model is a spherical center angle that corresponds to a chord and that is equal to the horizontal field angle.

17. The non-transitory computer readable storage medium according to claim 13, wherein the establishing a spherical model according to a horizontal field angle and a vertical field angle of the lens, and inscribing the shaped projection plane model to the spherical model, spherical center angles of corresponding directions formed by intersections of the shaped projection plane model and the spherical model in a horizontal direction and a vertical direction corresponding to the horizontal field angle and the vertical field angle of the lens, respectively comprises:

establishing a spherical model, placing the shaped projection plane model to be perpendicular to a radial direction of the spherical model, and equally zooming the spherical model according to the vertical field angle of the lens, so that a vertical center line of the shaped projection plane model is a spherical center angle that corresponds to a chord and that is equal to the horizontal field angle.

18. The non-transitory computer readable storage medium according to claim 13, wherein the step of casting, from a spherical center of the spherical model, rays to four edges of the shaped projection plane model, wherein a spherical surface of the spherical model intercepted by the rays defines a shaped cambered spherical model comprises:

casting, from the spherical center of the spherical model, multiple rays to the four edges of the shaped projection plane model, to construct a rectangular pyramid; and projecting the rectangular pyramid along a radial direction of the spherical model, to intersect with the spherical surface of the spherical model, intercepting a part of the spherical model, and using the intercepted part of the spherical model as the shaped cambered spherical model.

* * * * *